United States Patent
Park et al.

(10) Patent No.: US 7,280,856 B2
(45) Date of Patent: Oct. 9, 2007

(54) PORTABLE TERMINAL HAVING TUNER FOR CHANGING RADIATION PATTERN

(75) Inventors: Jung-Ho Park, Suwon-si (KR);
Wan-Jin Choi, Suwon-si (KR);
Seonk-Kyeng Kim, Suwon-si (KR);
Ho-Soo Seo, Suwon-si (KR);
Won-Chan Kim, Suwon-si (KR);
Jae-Joon Choi, Suwon-si (KR);
Taig-Jong Yoo, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 269 days.

(21) Appl. No.: 10/834,737

(22) Filed: Apr. 29, 2004

(65) Prior Publication Data

US 2004/0204027 A1    Oct. 14, 2004

(30) Foreign Application Priority Data

| May 24, 2003 | (KR) | ........................ 10-2003-0033198 |
| Jul. 30, 2003 | (KR) | ........................ 10-2003-0052625 |
| Dec. 4, 2003 | (KR) | ........................ 10-2003-0087754 |

(51) Int. Cl.
*H04M 1/00* (2006.01)
(52) U.S. Cl. .............................. 455/575.3; 455/575.5; 455/575.7
(58) Field of Classification Search ............ 455/550.1, 455/575.1, 575.3, 575.5, 575.7, 107, 193, 455/274; 343/700 R, 700 MS
See application file for complete search history.

(56) References Cited

U.S. PATENT DOCUMENTS

| 6,246,374 | B1 * | 6/2001 | Perrotta et al. ............. 343/702 |
| 6,342,859 | B1 * | 1/2002 | Kurz et al. .................. 343/702 |
| 6,442,377 | B1 | 8/2002 | Martensson |
| 6,885,880 | B1 * | 4/2005 | Ali .......................... 455/575.7 |
| 6,898,282 | B2 * | 5/2005 | Cho ....................... 379/428.01 |
| 6,900,768 | B2 * | 5/2005 | Iguchi et al. ............... 343/702 |
| 6,903,694 | B2 * | 6/2005 | Kim ......................... 343/702 |
| 7,031,762 | B2 * | 4/2006 | Shoji et al. ............. 455/575.5 |
| 2005/0026660 | A1 * | 2/2005 | Park et al. ............... 455/575.5 |
| 2005/0030233 | A1 * | 2/2005 | Kim et al. .................. 343/702 |
| 2005/0143151 | A1 * | 6/2005 | Ito et al. ................. 455/575.3 |
| 2006/0019730 | A1 * | 1/2006 | Kim et al. ............... 455/575.7 |
| 2006/0089184 | A1 * | 4/2006 | Kim et al. ............... 455/575.5 |

FOREIGN PATENT DOCUMENTS

| CN | 1366439 | 8/2002 |
| DE | 101 34 848 | 7/2001 |
| WO | WO 02/071534 | 9/2002 |

* cited by examiner

*Primary Examiner*—Sonny Trinh
(74) *Attorney, Agent, or Firm*—The Farrell Law Firm

(57) ABSTRACT

A portable terminal having a tuner for changing an antenna radiation pattern is disclosed. In the portable terminal, a main body has a main body PCB and a main body ground defined in the main body PCB. A folder is rotatably connected to the main body by a hinge device. An antenna device is provided at an upper end of the main body. The tuner is formed at a predetermined position of the main body in the vicinity of the antenna device, for changing a current distribution of the main body and thus changing an antenna radiation pattern of the portable terminal.

18 Claims, 20 Drawing Sheets

PORTABLE TERMINAL HAVING TUNER FOR CHANGING RADIATION PATTERN

PRIORITY

This application claims priority under 35 U.S.C. § 119 to an application entitled "Specific Absorption Ratio Decreasing Element for Portable Wireless Terminal" filed in the Korean Intellectual Property Office on May 24, 2003 and assigned Serial No. 2003-33198, to applications entitled "Mobile Phone Having Tuner Apparatus for Changing Radiation Pattern" filed in the Korean Intellectual Property Office on Jul. 30, 2003 and assigned Serial No. 2003-52625, and to applications entitled "Portable Terminal Having Tuning Apparatus for Changing Radiation Pattern" filed in the Korean Intellectual Property Office on Dec. 4, 2003 and assigned Serial No. 2003-87754, the contents of which are incorporated herein by reference.

BACKGROUND OF THE INVENTION

1. Field of the Invention

The present invention relates generally to a portable terminal having a tuner, and in particular, to a portable terminal having a tuner for changing an antenna radiation pattern by changing the current distribution of a ground provided to the portable terminal.

2. Description of the Related Art

As portable terminals are equipped with a variety of functions owing to the development of information communication technology, the trend for providing terminals of smaller size, of lighter weight and of improved portability. In an initial developmental stage where wireless communication is deployed, the portable terminals were confined to voice call, short message transmission, and the like, whereas they are becoming capable of transmitting/receiving multimedia data such as moving pictures provided by service providers, video conferencing via a wireless Internet, and moving picture mail.

A portable terminal is a unit that allows a user to wirelessly communicate with another party. Portable terminals include HHP (Hand Held Products), CT-2 (Cordless Telephone-2) cellular phones, smart phones, digital phones, PCS (Personal Communication Service) phones, PDAs (Personal Digital Assistants), and laptop computers, typically categorized according to their appearance.

The portable terminals usually use an LCD (Liquid Crystal Display) as a data output device. A keypad, a basic data input device, is provided via an arrangement of keys.

An antenna device is positioned appropriately for receiving a signal. Providing increased efficiency and, as more recently has become an issue, reduced SAR (Specific Absorption Rate) are challenging issues in designing the antenna device.

For applications to conventional portable terminals, whip antenna, helical antenna, sleeve antenna, N-type antenna, chip antenna, and FS-PIFA antenna are provided at the outside of the portable terminal. Thus, these antennas are called external antennas. On the other hand, inverted F antenna, planar inverted F antenna (PIFA), diversity antenna, microstrip antenna, twisted loop antenna, and EID (Electronic Identification) antenna are internal antennas that can be installed within the portable terminals.

Antennas utilized in portable terminals can also be divided into monopole or planar types according to how they excite radiated electromagnetic waves. Monopole type antennas include whip antenna, helical antenna, sleeve antenna, chip antenna, and N-type antenna, while planar type antennas include inverted F antenna, PIFA, diversity antenna, microstrip antenna, EID antenna, FS (FireStick)-PIFA, and RCDLA (Radiation Coupled Dual L-Antenna).

Although they typically operate in wide bands, the monopole antennas can create strong electromagnetic waves that have been alleged to adversely affect the human body. While it is easy to suppress the effects of electromagnetic waves from the planar antennas, these antennas do not have wide bands.

While the monopole antennas are external ones, recently developed antennas include a half-exposed, fixed monopole antenna, an internal monopole antenna with an electromagnetic wave absorber, as well as a SAR-reducing monopole antenna for a folder-type terminal, which have internal structures, operate in wide bands, and provides a low SAR.

The half-exposed, fixed monopole antenna provide excellent antenna efficiency, but is not as effective in reducing SAR as the wave absorbing internal monopole antenna. To the contrary, although the wave absorbing internal monopole antenna reduces SAR more effectively than the half-exposed, fixed monopole antenna, it has lower antenna efficiency.

As with a typical whip antenna, impedance matching is difficult due to the increase of coupling between an antenna element and the folder of a terminal in the half-exposed, fixed monopole antenna. Also, close arrangement of the antenna element and other terminal components decreases radiation efficiency. The requirement for a predetermined ground area makes it difficult to make the terminal thinner.

The monopole antenna designed for SAR reduction in a folder-type terminal, which was proposed to overcome the above problems, is excellent in both antenna efficiency and SAR reduction.

In the monopole antenna, however, because an electromagnetic wave absorber is positioned in the vicinity of a hinge device that connects two terminal bodies, electromagnetic wave leakage in the hinge device may lead to a SAR increase.

As illustrated in FIG. 1, FIG. 2 and FIG. 3, a folder-type portable terminal comprises a main body 10 having a plurality of keys 11 which are pressed to enter intended data and a microphone 12, a folder 20 having a main LCD 21, a sub LCD 24 for displaying input data, a speaker 22, a PCB 23 in the folder 20 and a hinge device 30 which connects the body 10 and the folder 20 along a hinge axis A1 and is rotatable so that the folder 20 advances toward or recedes away from the body 10.

Traditionally, the width of the folder 20 is relatively made wide as compared to its length, or the hinge axis A1 is defined near an antenna device 40 on the main body 10, for sake of fabrication convenience.

Therefore, electromagnetic waves from a power supply for the antenna can leak in the hinge device 30, which is positioned between the main body 10 and the folder 20, thereby increasing SAR.

Moreover, if the antenna is a monopole antenna, a ground surface perpendicular to an antenna element is needed within an upper portion of the main body 10. However, due to the hinge device 30, a sufficient antenna ground area is difficult to ensure and reduction of the thickness of the portable terminal is limited.

Meanwhile, a SAR-reducing folder-type terminal has been developed. It has the same configuration as the conventional folder-type portable terminal, except that an electromagnetic wave reflecting plate is attached on the inner or outer surface of the folder 20 such that it faces the antenna device when the folder 20 is opened.

In this case, the antenna can be a helical antenna, a whip antenna, or a half-exposed, fixed monopole antenna. Use the half-exposed, fixed monopole antenna, allows the antenna ground surface to be easily obtained by the reflecting plate. If the antenna ground surface must be secured on the upper surface of the main body by using the whip or helical antenna, the ground surface itself will be narrow.

Folder-type portable terminals typically have a ground larger than ¼λ of its operating frequency, e.g. 1800 MHz. The ground refers to a part of the main body or folder where electrical current flows. Depending upon the current distribution of the folder, a radiation pattern can greatly vary. Because there is no specific solution for SAR reduction, SAR, reduction, attempts have been made to reduce SAR by lowering antenna output, thereby deteriorating the operation characteristics of the antenna device.

The radiation pattern of the existing folder-type portable terminal depends predominantly on a limited ground size of the terminal. The radiation pattern of the portable terminal affects SAR as well as the operation performance of the terminal. Conventional SAR reduction techniques are accompanied by degraded antenna radiation performance, which in turn degrades the operation performance of the portable terminal.

SUMMARY OF THE INVENTION

An object of the present invention is to substantially solve at least the above problems and/or disadvantages and to provide at least the advantages below. Accordingly, an object of the present invention is to provide a portable terminal having a tuner configured for changing an antenna radiation pattern by changing the current distribution of a ground, thereby reducing SAR and improving antenna operation characteristics.

According to one aspect of the present invention, in a portable terminal, a main body of the terminal has a main body PCB and a main body ground defined in the main body PCB. A folder is rotatably connected to the main body by a hinge device. An antenna device is provided at an upper end of the main body. A tuner is formed at a predetermined position of the main body in the vicinity of the antenna device, for changing a current distribution of the main body and thus changing an antenna radiation pattern of the portable terminal.

According to another aspect of the present invention, in a portable terminal, a folder has a folder PCB and a folder ground defined in the folder PCB. The folder is rotatably connected to a main body by a hinge device. An antenna device is provided at an upper end of the main body. A tuner is formed at a predetermined position of the folder in the vicinity of the antenna device, for changing a current distribution of the main body and thus changing an antenna radiation pattern of the portable terminal.

According to a further aspect of the present invention, in a portable terminal, a main body has side hinge arms at both upper ends thereof, a folder has a center hinge arm rotatably connected between the side hinge arms and hinged to the main body, an antenna device protrudes from an upper end of the main body, and a tuner is formed into a predetermined pattern in the center hinge arm, for changing a radiation pattern of the antenna device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
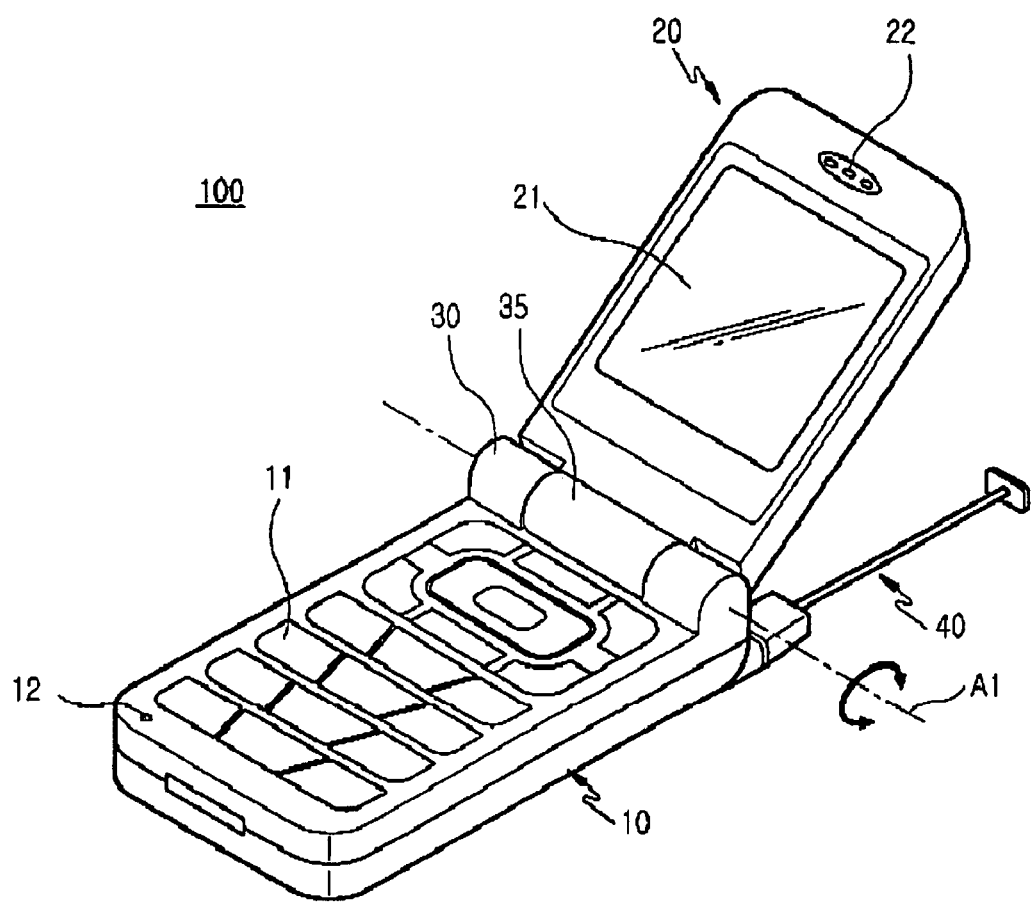
FIG. 1 is a perspective view illustrating a conventional folder-type portable terminal in an open state.
Figure 2:
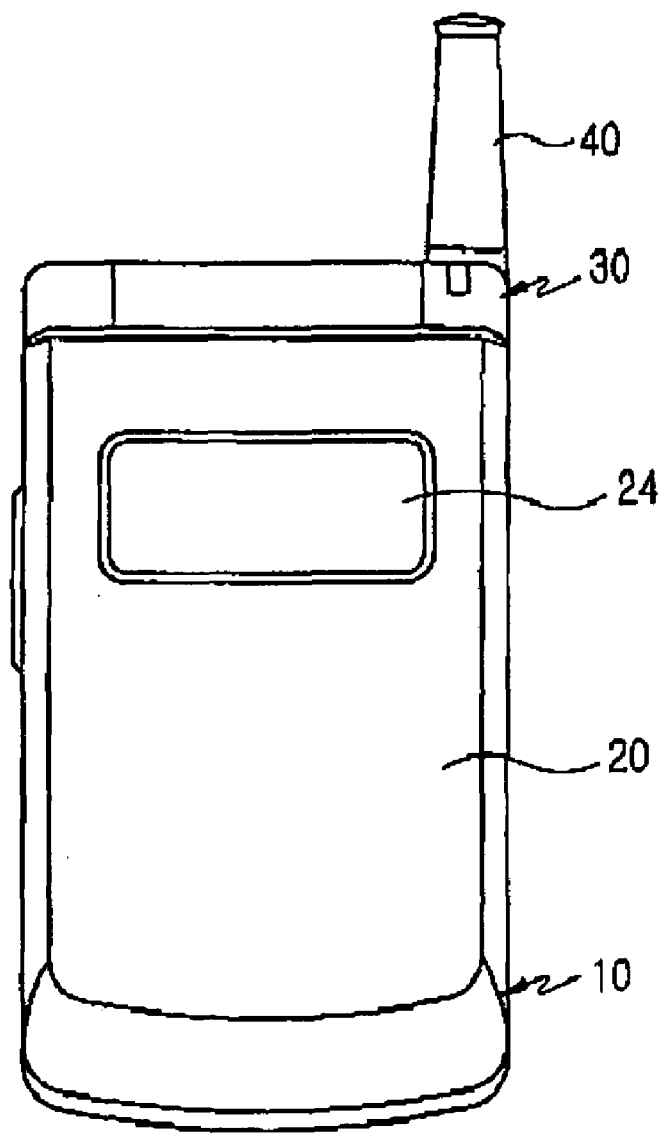
FIG. 2 is a plan view of a the conventional folder-type portable terminal in a closed state.
Figure 3:
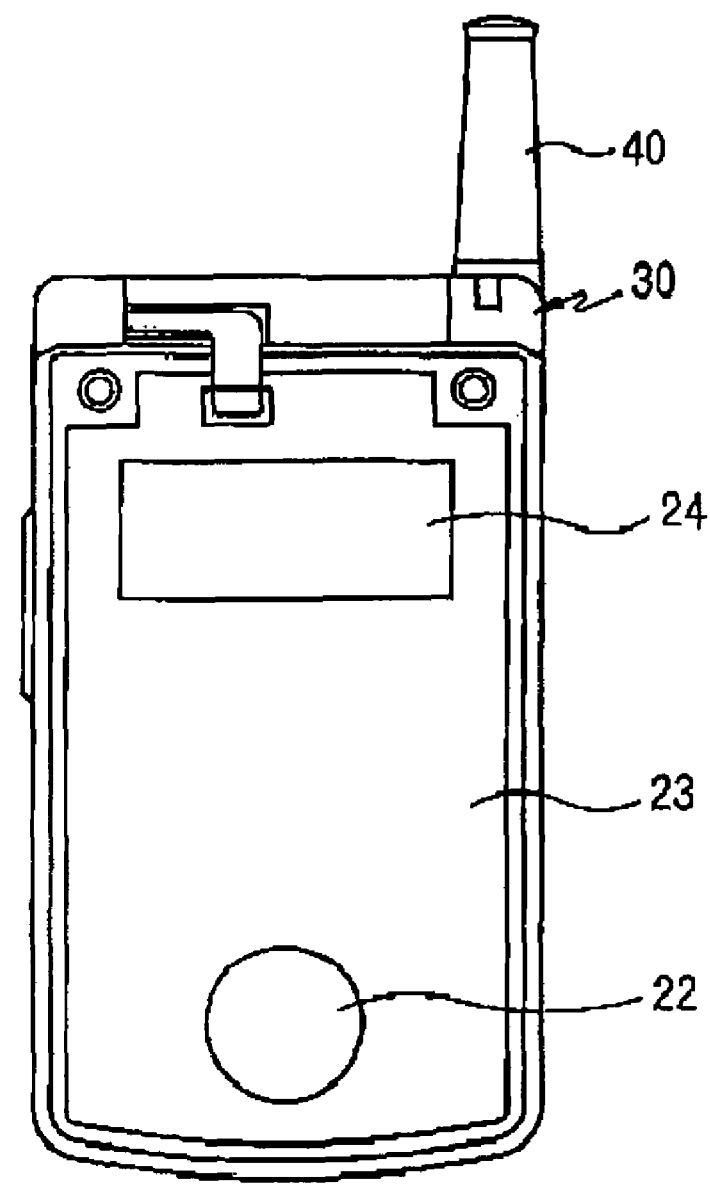
FIG. 3 is a view of the interior structure of a folder in the conventional folder-type portable terminal illustrated in FIG. 2.

Preferred embodiments of the present invention will be described herein below with reference to the accompanying drawings. In the following description, well-known functions or constructions are not described in detail since they would obscure the invention in unnecessary detail.

Referring to FIGS. 7 to 23, portable terminals according to two preferred embodiments of the present invention comprise the main body 10 having a PCB 13 and a ground 400 defined in the PCB 13, and the folder 20 having a PCB 23 and a ground 4000 defined in the PCB 23. The hinge device 30 is provided at an end of the main body 10, for connecting the main body 10 to the folder 20. The antenna device 40 is installed at an appropriate position on an upper end of the main body 10.

Referring to FIGS. 7 to 15, in the portable terminal according to a first preferred embodiment of the present invention, a tuner 100 is disposed within the main body 10, in the vicinity of the antenna device 40, for concurrently changing the current distribution of the main body ground 400 and the antenna radiation pattern of the main body 10.

The tuner 100 preferably has an "F" or a "P" shape. The tuner 100 is provided, at an end 101 thereof, with a connector 300 that comes into contact with a grounding portion 13a of the main body ground 400. The other end 102 of the tuner 100 is remote, i.e. positioned away, from the grounding portion 13a and is positioned in the end of main body 10 to closest to the antenna device 40.

The tuner 100 can be formed in a predetermined pattern using a conductive paint so that it is easily connected to the grounding portion 13a of the main body ground 400. Also, the tuner 100 may be formed of a metal to easily change the current distribution of the main body ground 400.

Figure 9:
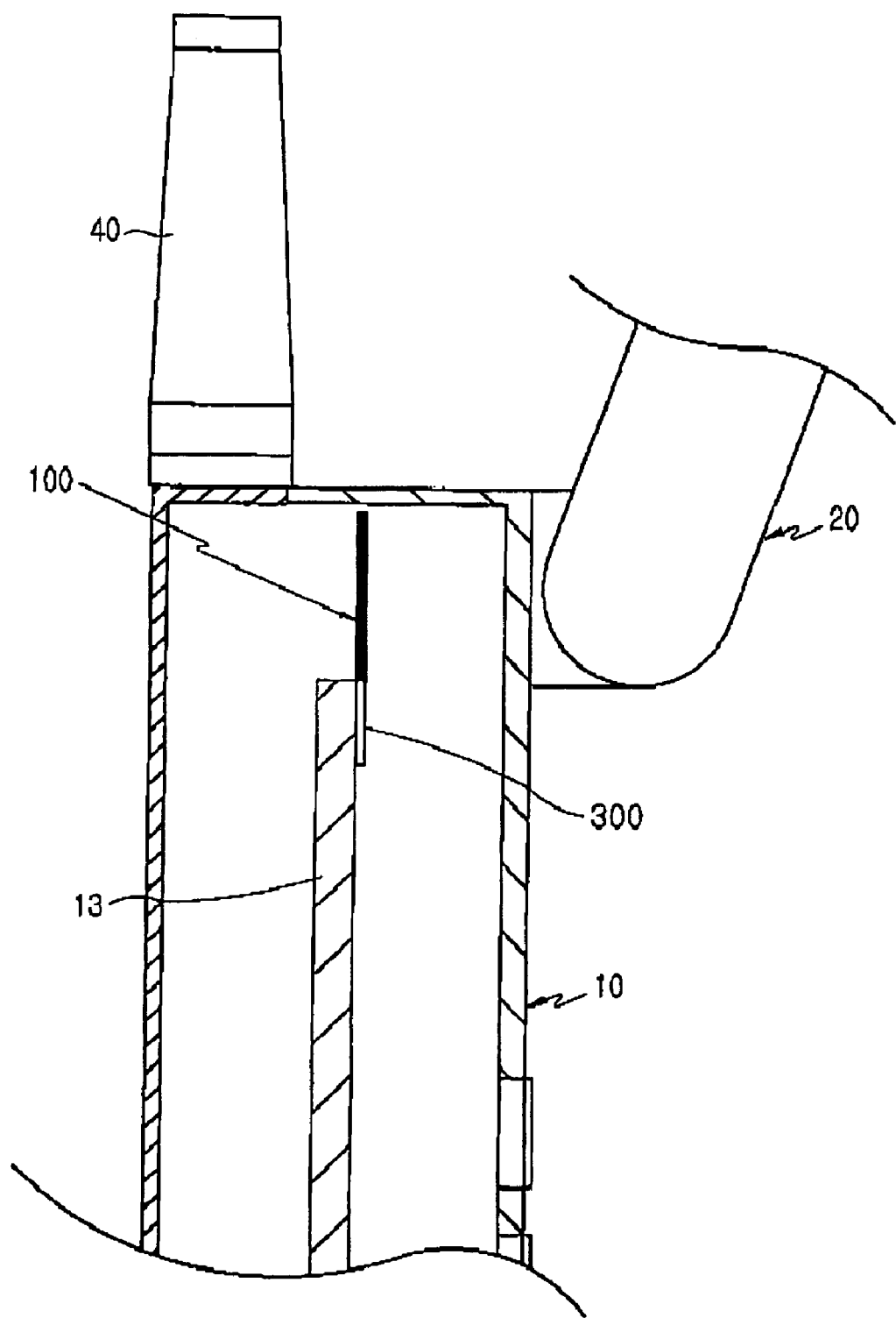
FIG. 9 is a side sectional view illustrating an embodiment of a tuner mounted on a main body PCB (Printed Circuit Board) in the main body of the portable terminal illustrated in FIG. 7.
Figure 10:
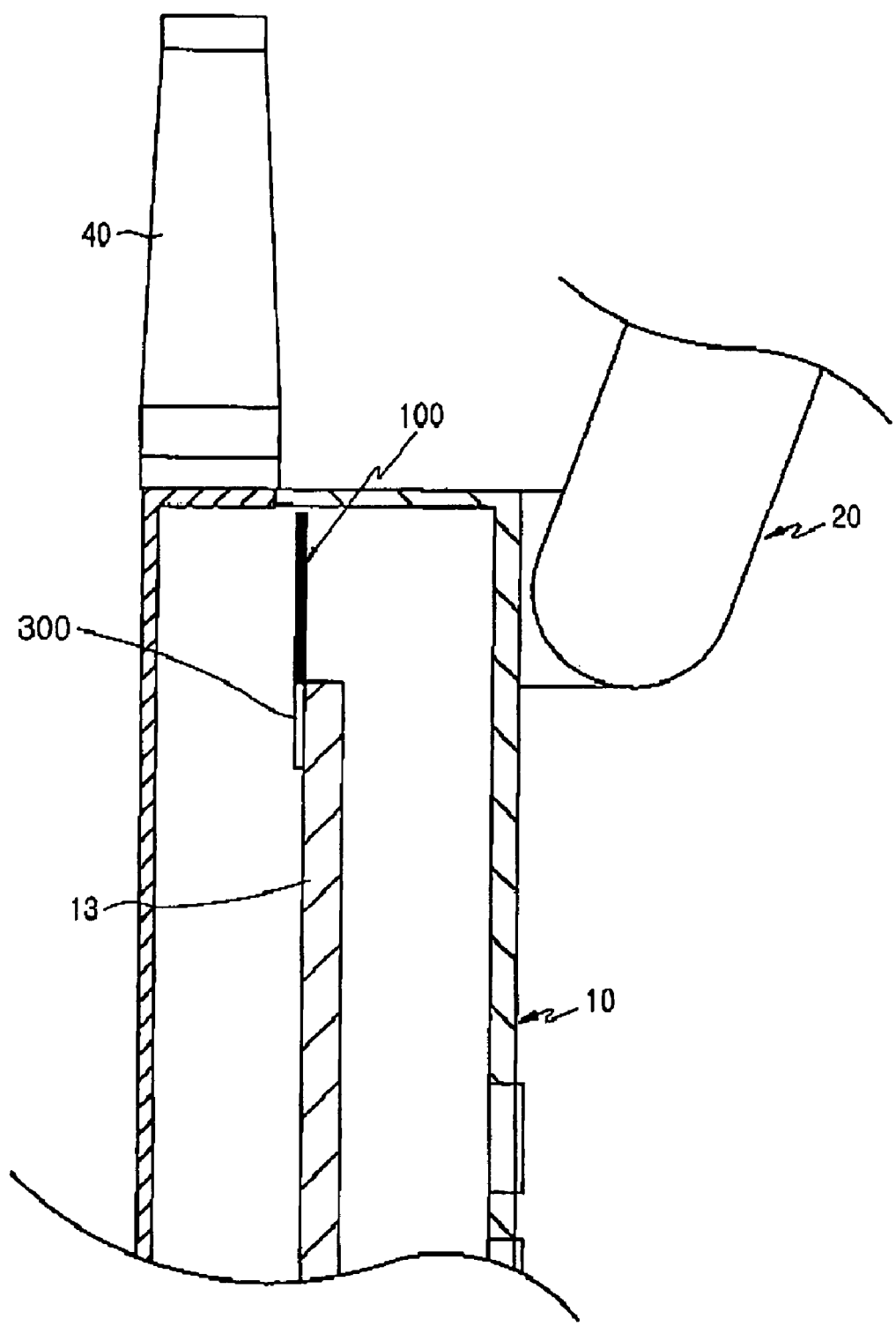
FIG. 10 is a side sectional view illustrating another embodiment of a tuner mounted under the main body PCB in the main body of the portable terminal illustrated in FIG. 7.

As illustrated in FIGS. 9 and 10, the tuner 100 is provided on the top surface or bottom surface of the main body PCB 13. The top or bottom surfaces of the main body PCB 13 respectively correspond to the surface that is away from or closer to the antenna 40.

The tuner 100 changes the current distribution of the main body ground 400 and thus changes the antenna radiation pattern of the terminal. At the same time, the tuner 100 reduces SAR and improves antenna operation characteristics, i.e. field performance. Tuning can be carried out such that the antenna radiation pattern is changed by controlling the pattern of the tuner 100, that is, the length or structure of the tuner 100.

Figure 11:
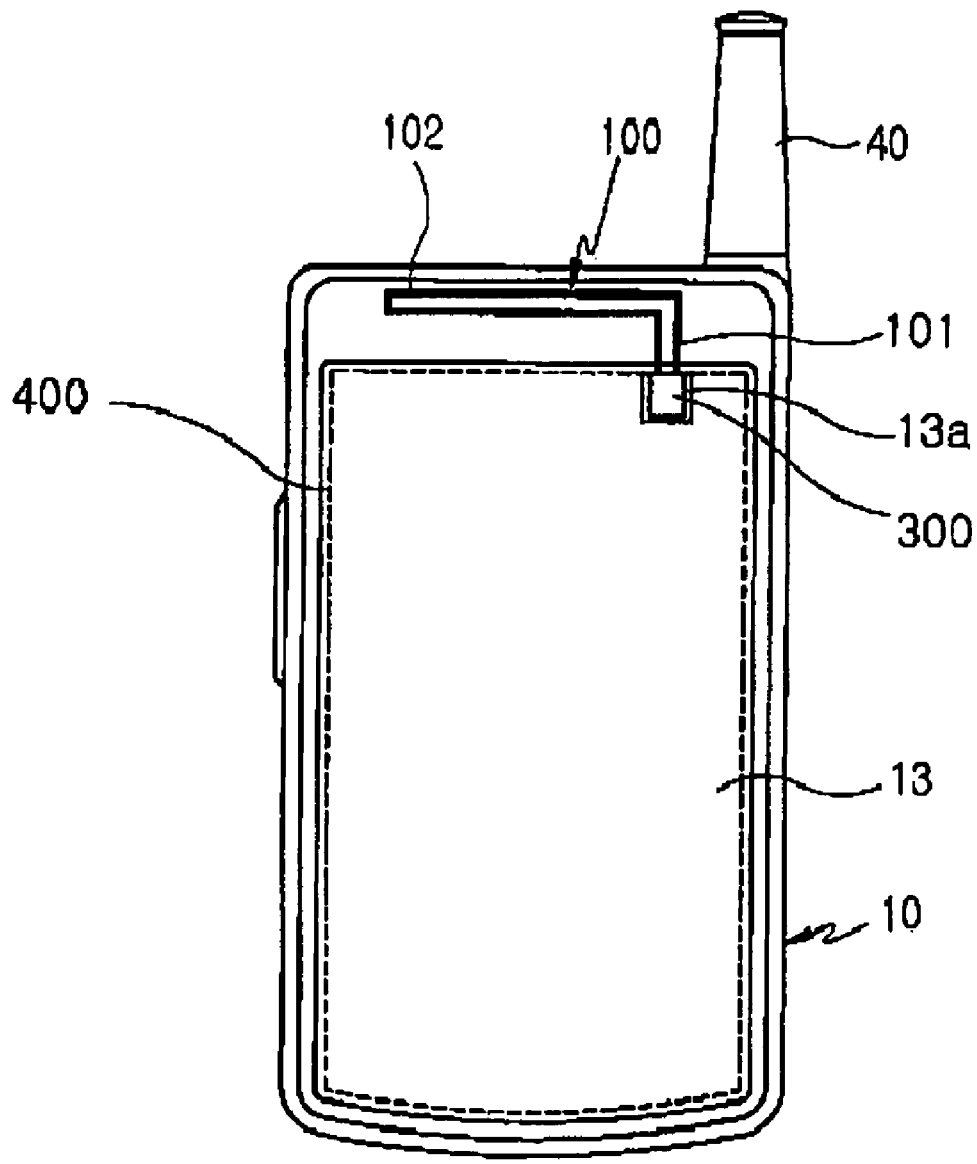
FIG. 11 is a view of the interior structure of the main body showing another embodiment of the pattern of the tuner.
Figure 12:
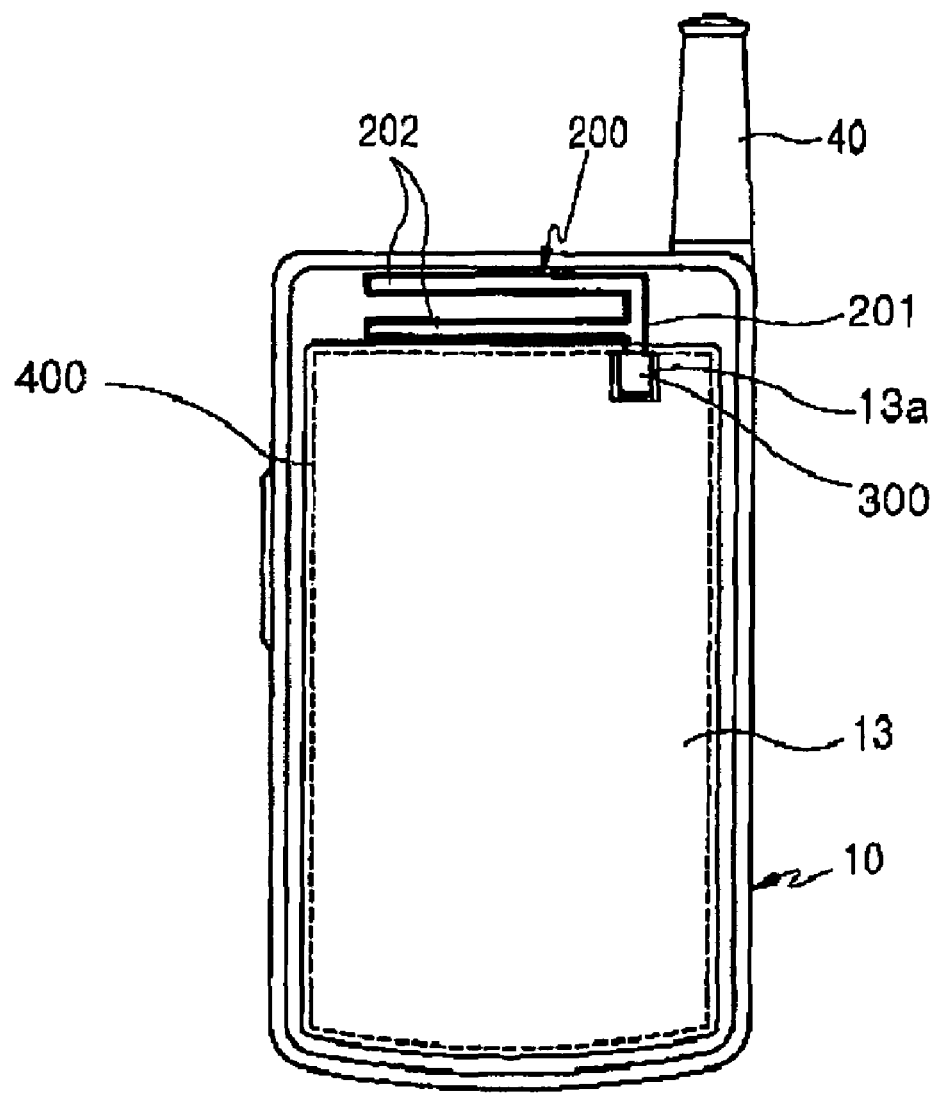
FIG. 12 illustrates another pattern of the tuner in the main body of the portable terminal illustrated in FIG. 7.

As illustrated in FIGS. 11 and 12, the tuner 100 can be formed in a "P" shape or an "F" shape, respectively.

Referring to FIG. 12, an F-shaped tuner 200 is provided, at end 201 thereof, with the connector 300. The other two ends 202 of the tuner 200 are extended in parallel with each other along the length of the hinge device 30 such that they are remote, i.e. positioned away, from the grounding portion 13a and are positioned in the same end of main body 10 as the antenna device 40.

Figure 4:
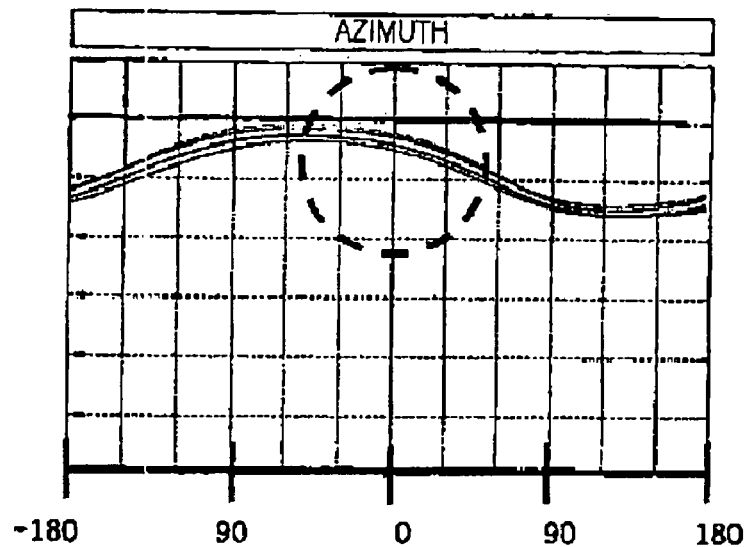
FIG. 4 is a graph illustrating the azimuth radiation pattern of the conventional folder-type portable terminal illustrated in FIG. 1.
Figure 13:
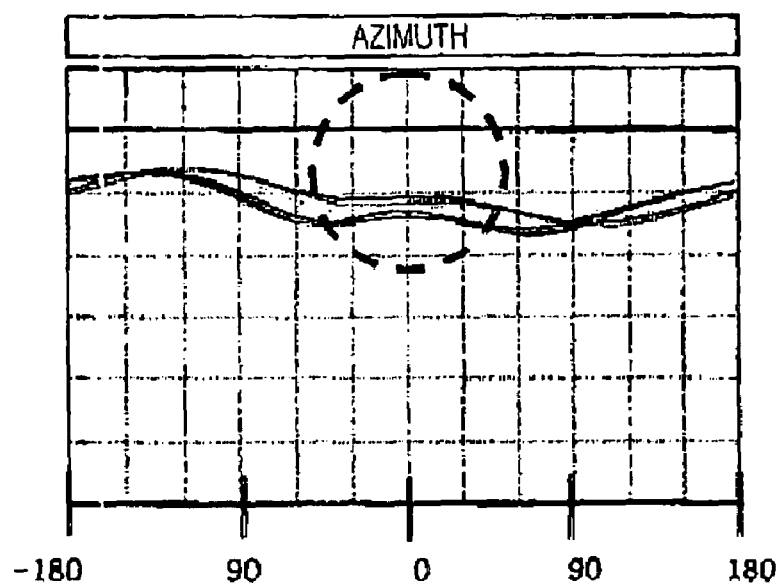
FIG. 13 is a graph illustrating the azimuth radiation pattern of the portable terminal illustrated in FIG. 7.

FIG. 13 is a graph illustrating an azimuth radiation pattern of the portable terminal having the tuner 100 according to the embodiment of the present invention. The direction of zero degrees (0) indicated on the abscissa is a direction toward the user's head. Comparison with the azimuth radiation pattern of the conventional portable terminals which lack a tuner, as illustrated in FIG. 4, reveals that the portable terminal having the tuner 100 radiates less electromagnetic energy toward the human body.

Figure 5:
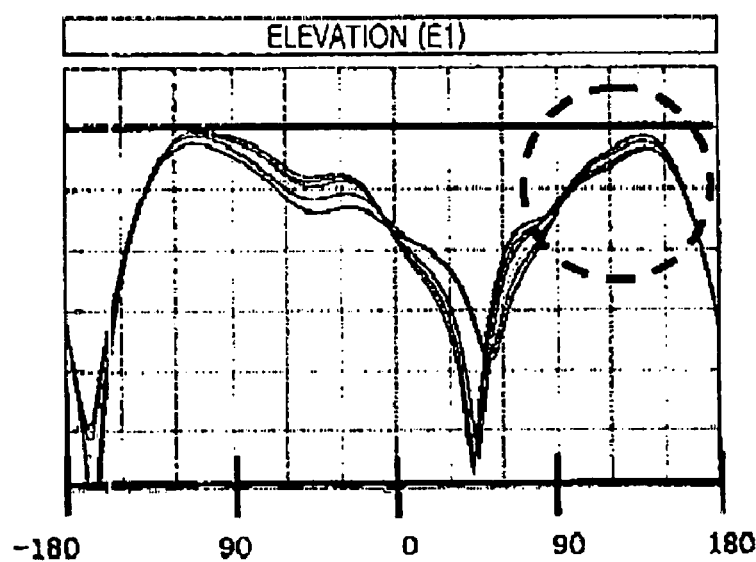
FIG. 5 is a graph illustrating an elevation (E1) radiation pattern of the conventional folder-type portable terminal illustrated in FIG. 1.
Figure 6:
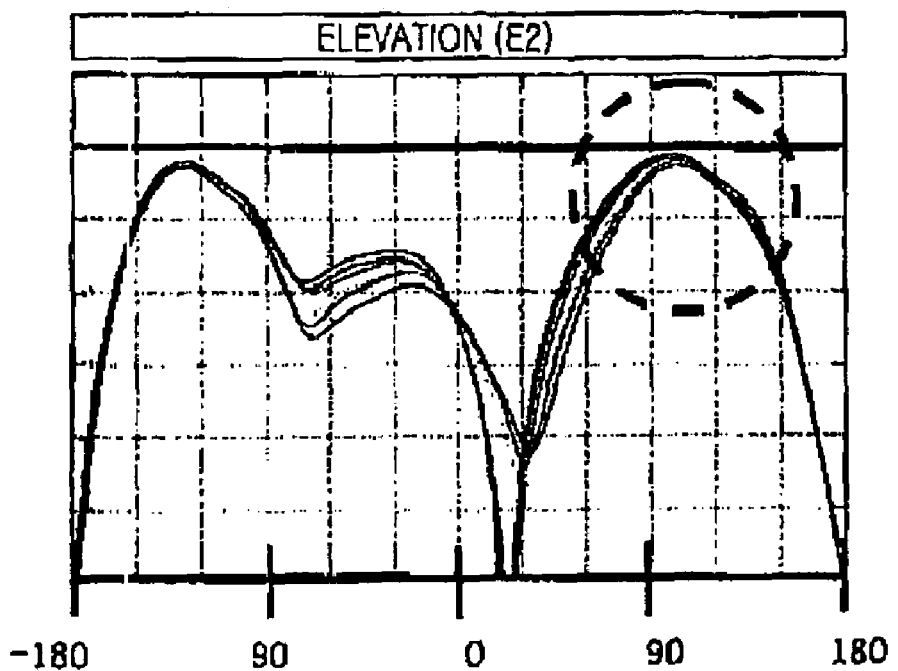
FIG. 6 is a graph illustrating an elevation (E2) radiation pattern of the conventional folder-type portable terminal illustrated in FIG. 1.
Figure 7:
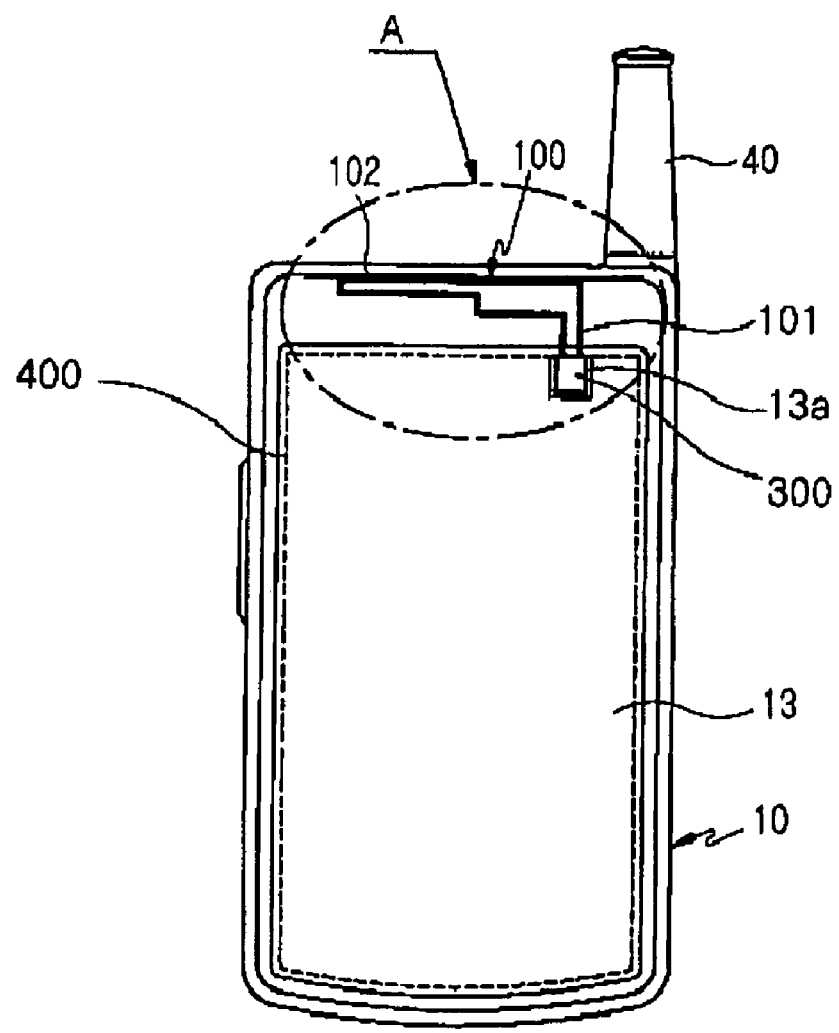
FIG. 7 is a view of the interior structure of the main body showing a preferred embodiment of the present invention.
Figure 8:
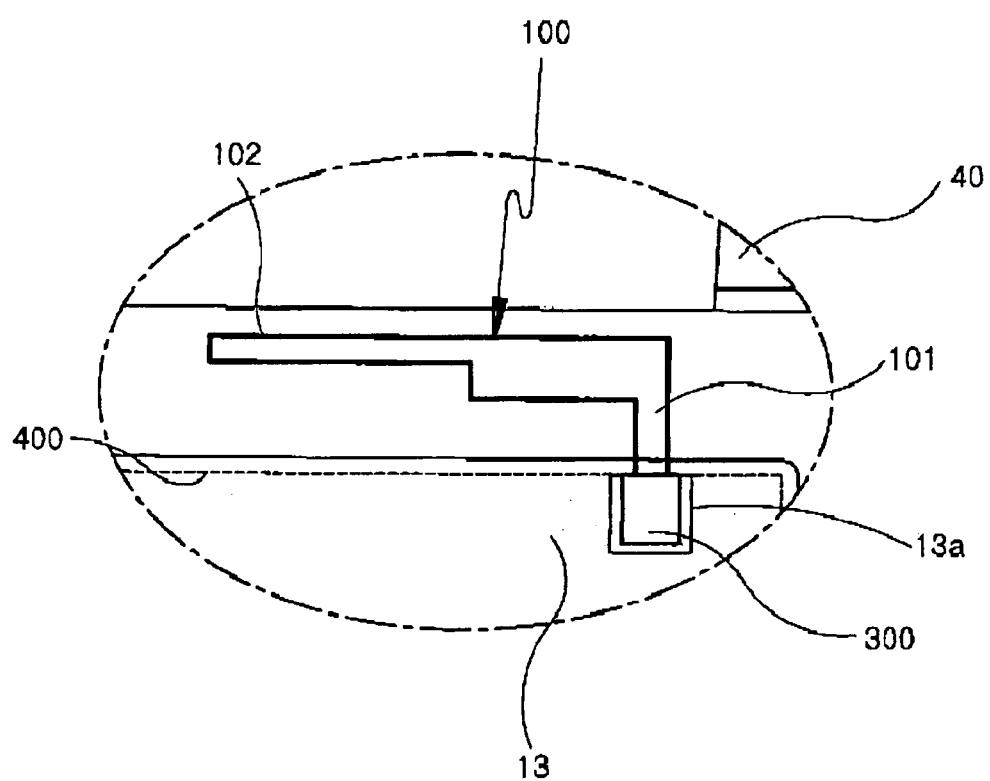
FIG. 8 is an enlarged view of a portion "A" illustrated in FIG. 7.
Figure 14:
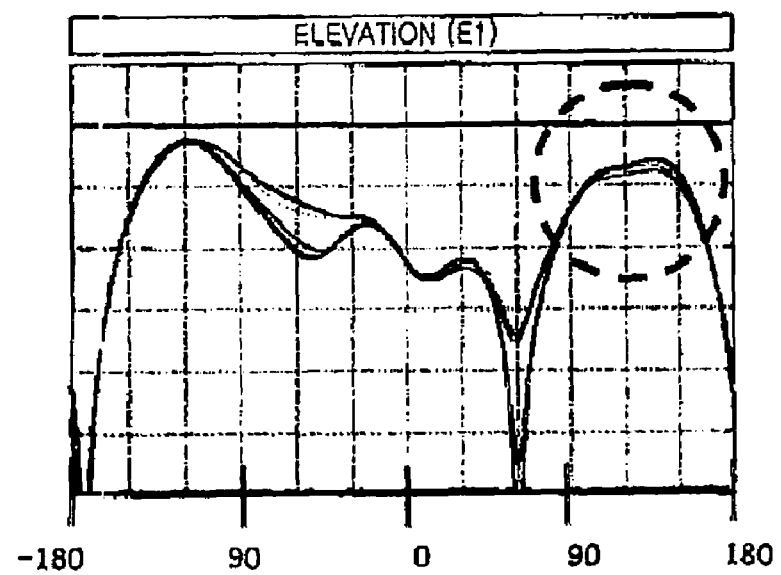
FIG. 14 is a graph illustrating an E1 radiation pattern of the portable terminal illustrated in FIG. 7.
Figure 15:
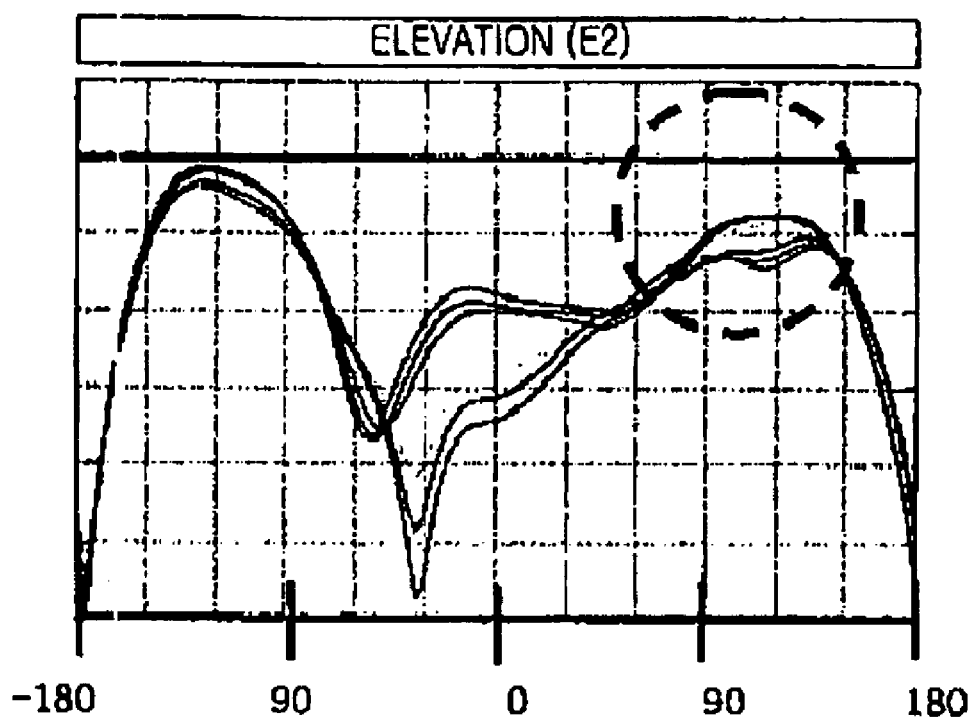
FIG. 15 is a graph illustrating an E2 radiation pattern of the portable terminal illustrated in FIG. 7.

FIGS. 14 and 15 are graphs illustrating elevations E1 and E2 radiation patterns of the portable terminal with the tuner 100 according to the first embodiment of the present invention. A range between of 90 to 150 in the elevation patterns corresponds to the direction toward the human body. Comparison with the E1 and E2 radiation patterns of the conventional portable terminals which lack a tuner, as illustrated in FIGS. 5 and 6, reveals that portable terminals having the tuner 100 radiate less electromagnetic energy toward the human body.

With reference to FIGS. 16 to 23, the operation of a portable terminal having a tuner for changing a radiation pattern according to another preferred embodiment of the present invention will be described below.

Figure 16:
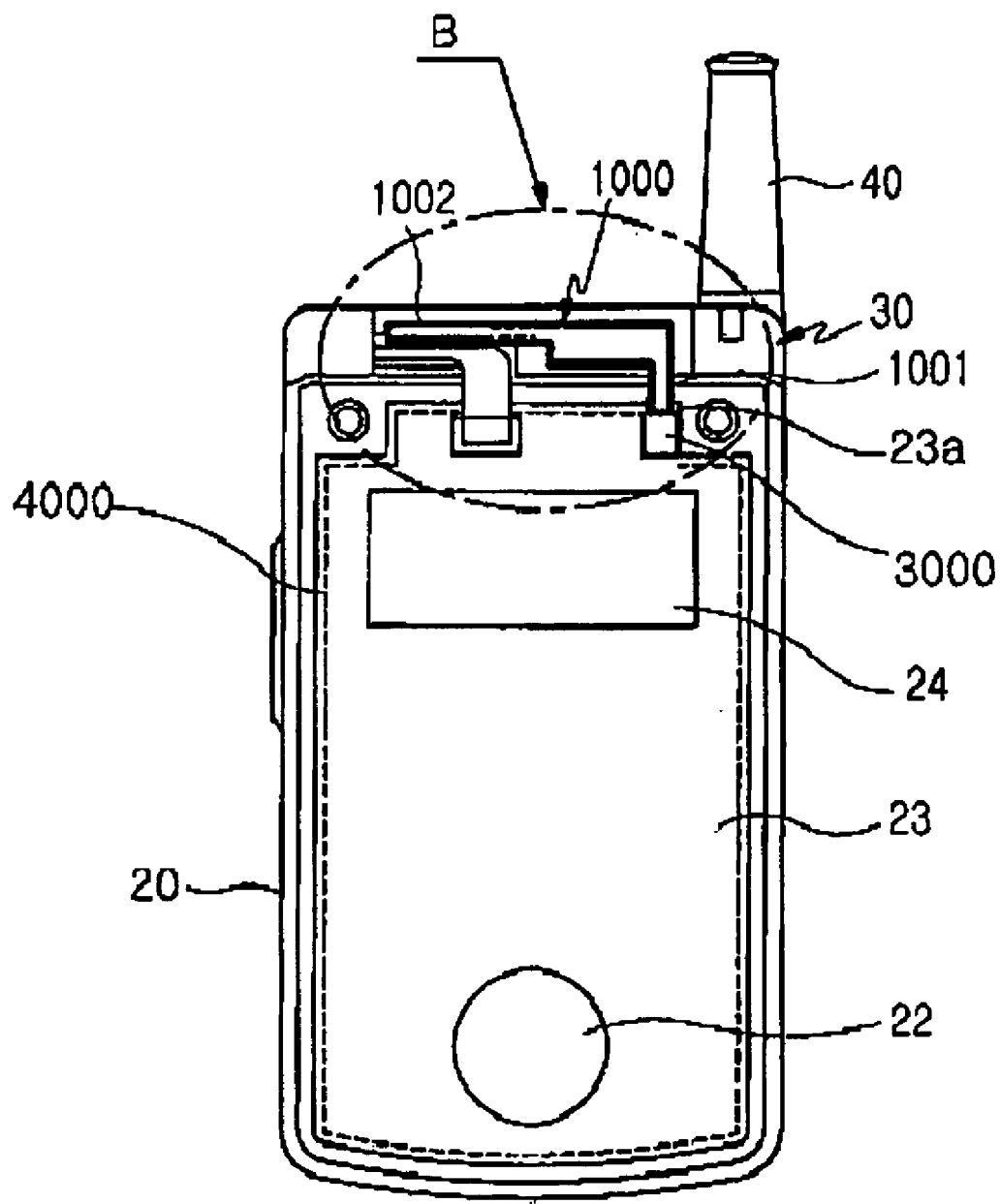
FIG. 16 illustrates the interior structure of a folder of a portable terminal having a tuner pattern according to another preferred embodiment of the present invention.
Figure 17:
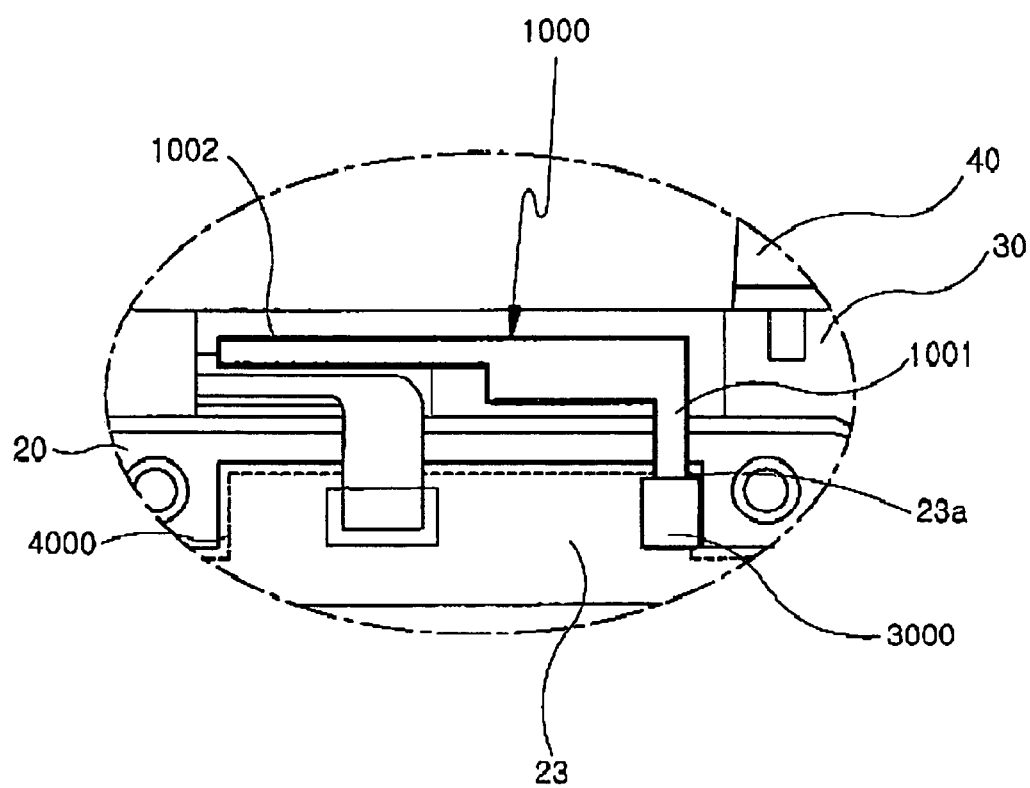
FIG. 17 is an enlarged view of a portion "B" illustrated in FIG. 16.

As illustrated in FIGS. 16 and 17, the portable terminal comprises a tuner 1000 positioned at an end of the folder 20.

The tuner 1000 changes the current distribution of a folder ground 4000 defined in the folder 20 and thus changes the antenna radiation pattern of the terminal. At the same time, it reduces SAR and improves field performance.

The tuner 1000 is preferably disposed in the vicinity of the antenna 40. The tuner 1000 is provided, at an end 1001 thereof, with a connector 3000 that comes into contact with a grounding portion 23a of the folder ground 4000 defined on the antenna frame or the folder PCB 23. The other end 1002 of the tuner 1000 is disposed remote from the grounding portion 23a and is positioned in the end of folder 20 closest to the antenna device 40. The length or structure of the tuner 1000 is adjusted depending on the change of the antenna radiation pattern.

Figure 18:
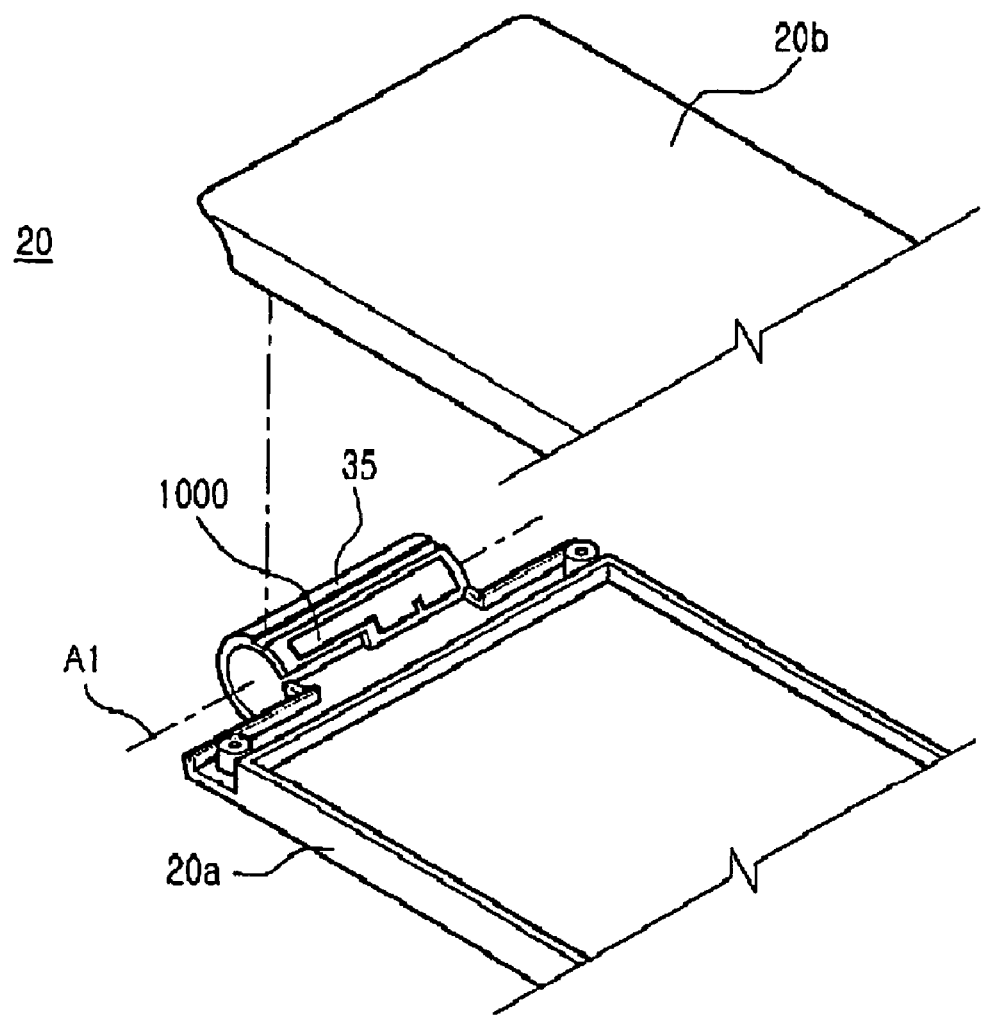
FIG. 18 is an exploded perspective view illustrating the folder of the portable terminal illustrated in FIG. 16.

FIG. 18 is an exploded perspective view illustrating the tuner 1000 illustrated in FIG. 16 mounted on the folder 20. The tuner 1000 is formed into a predetermined pattern within a center hinge arm 35 formed at an end of the folder 20.

The folder 20 is provided with a front case 20a and a rear case 20b attached to the rear of the front case 20a. The front case 20a faces the main body 10 when the folder 20 is hingeably closed to the main body 10. The front case 20a is provided, at an end thereof, with the center hinge arm 35. An outer circumferential portion of the center hinge arm 35 is covered with the rear case 20b.

Preferably, the tuner 1000 is positioned within the center hinge arm 35 and, more specifically, extends along the hinge axis A1 at the outer circumferential portion of the center hinge arm 35, which is covered with the rear case 20b. While the tuner 1000 is preferably formed by coating a portion of the center hinge arm 35 of the folder 20 with a conductive paint, alternative embodiments of the present invention can utilize a conductive cloth tape or an attachable metal pattern. The tuner 1000 is preferably connected to a ground line of the folder PCB 23 or to a conductive spray coated in the folder 20.

The tuner 1000 having the above-described configuration expands the grounding of the PCB and changes the radiation pattern of the antenna device, thereby reducing SAR.

Figure 19:
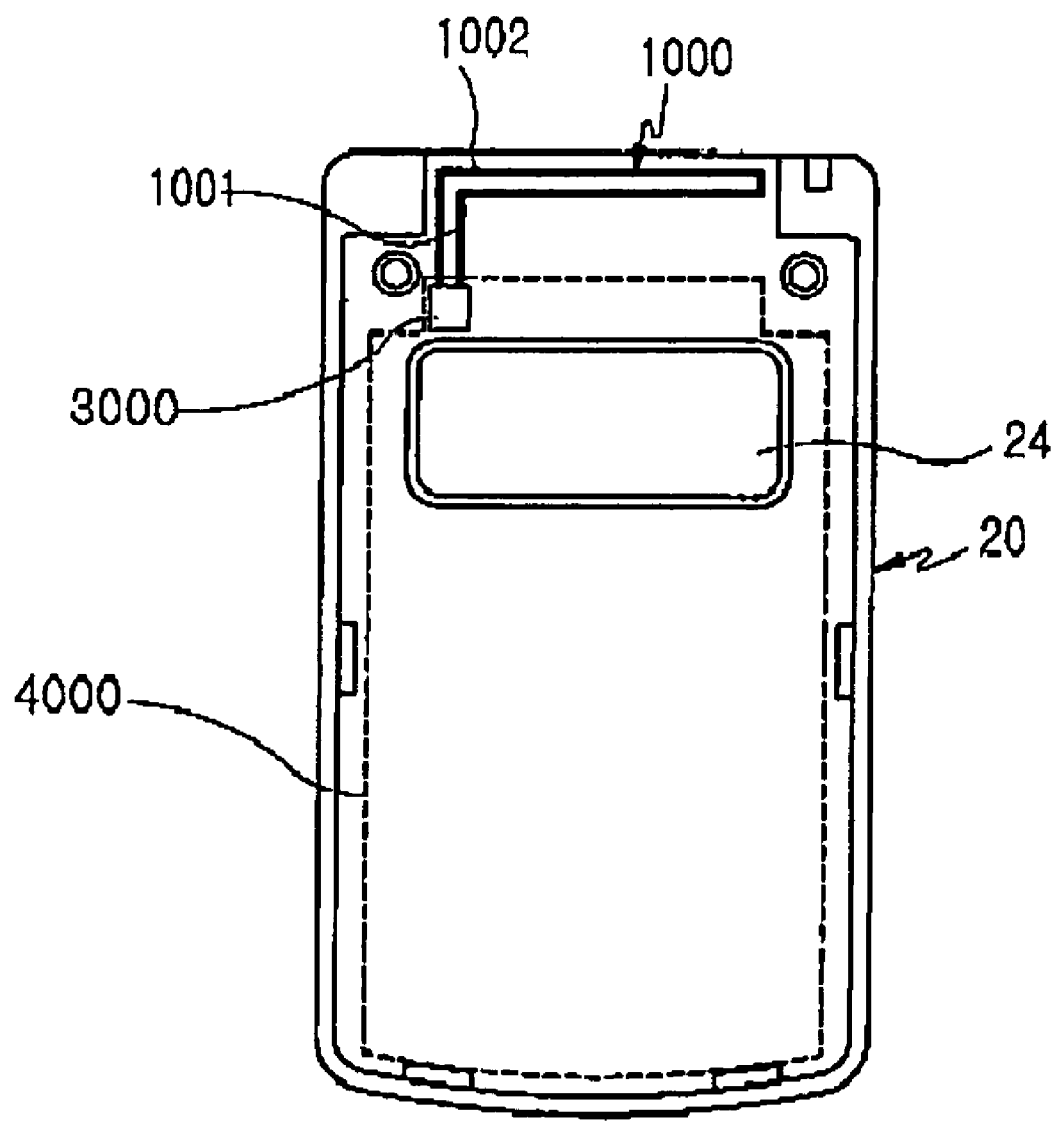
FIG. 19 illustrates an alternative pattern of a tuner in the folder of the portable terminal illustrated in FIG. 16.
Figure 20:
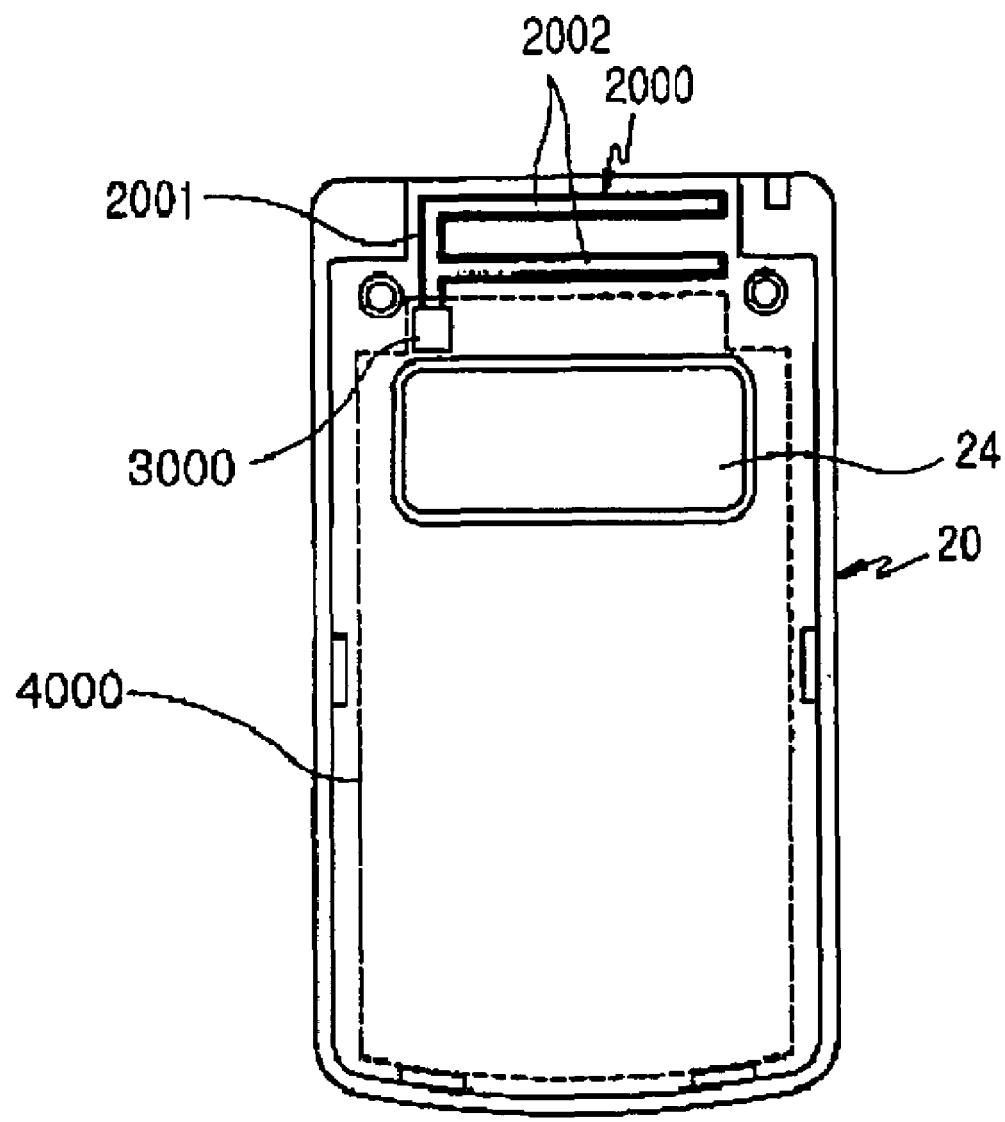
FIG. 20 illustrates another pattern of the tuner in the folder of the portable terminal illustrated in FIG. 16.

As illustrated in FIGS. 19 and 20, the tuner 1000 preferably has an "F" or a "P" shape.

Referring to FIG. 20, an F-shaped tuner 2000 is provided, at end 2001 thereof, with the connector 3000. The other two ends 2002 of the tuner 2000 are extended in parallel with each other along the length of the hinge device 30 such that they are remote from the grounding portion 23a and near to the antenna device 40.

Figure 21:
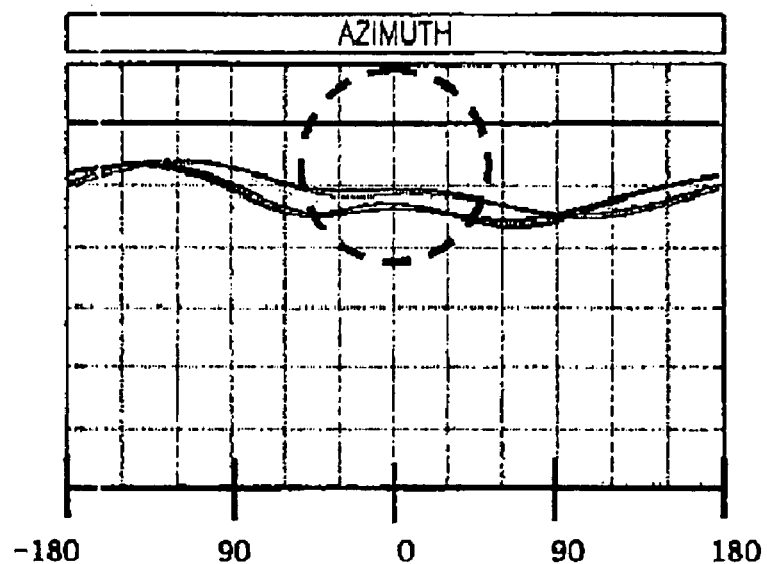
FIG. 21 is a graph illustrating the azimuth radiation pattern of the portable terminal illustrated in FIG. 16.

FIG. 21 is a graph illustrating an azimuth radiation pattern of the portable terminal having the tuner 1000 according to the second embodiment of the present invention. The direction of zero degrees (0) shown on the abscissa is a direction toward the user's head. Comparison with the azimuth radiation pattern of the conventional portable terminals which lack a tuner, as illustrated in FIG. 4, reveals that portable terminals having the tuner 1000 radiate less electromagnetic energy toward the human body.

Figure 22:
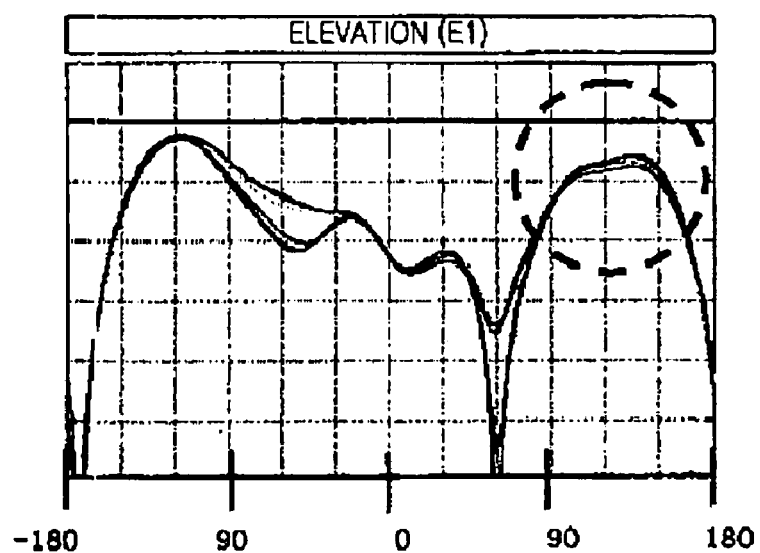
FIG. 22 is a graph illustrating an E1 radiation pattern of the portable terminal illustrated in FIG. 16.
Figure 23:
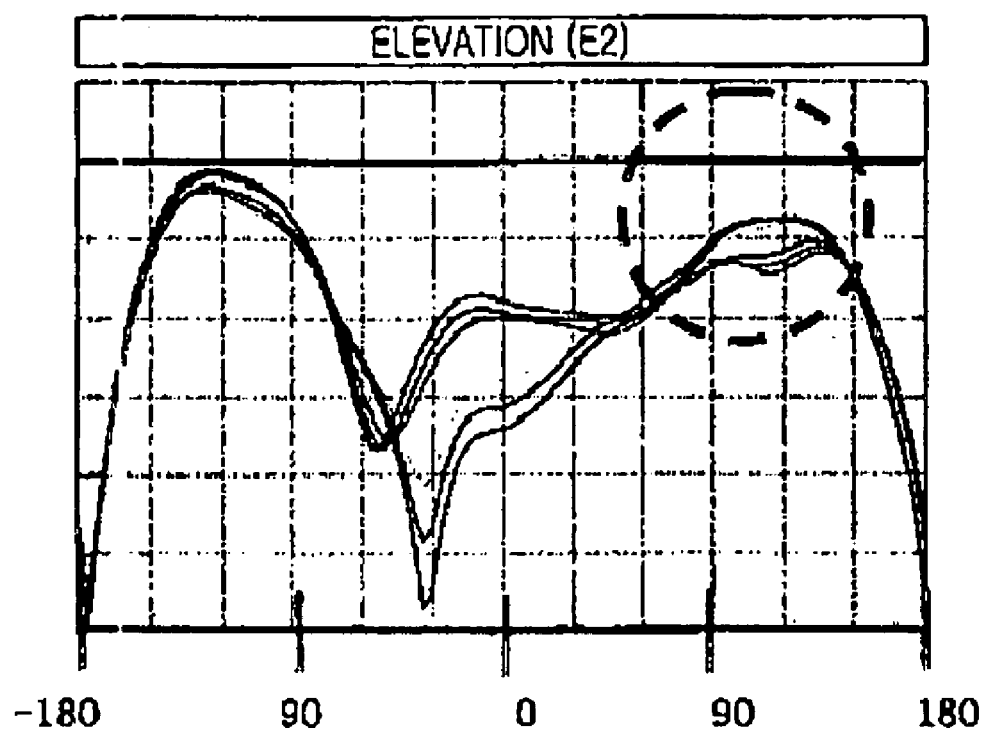
FIG. 23 is a graph illustrating an E2 radiation pattern of the portable terminal illustrated in FIG. 16.

FIGS. 22 and 23 are graphs illustrating elevations E1 and E2 radiation patterns of the portable terminal with the tuner 1000 according to the second embodiment of the present invention. A range between of 90 to 150 in the elevation patterns corresponds to the direction toward the user's body. Comparison with the E1 and E2 radiation patterns of the conventional portable terminals which lack a tuner, as illustrated in FIGS. 5 and 6, reveals that portable terminals having the tuner 1000 radiate less electromagnetic energy toward the user's body.

By configuring the tuner 100 (or 1000) so as to change the current distribution of the main body 10 and the folder 20 and thus change the antenna radiation pattern, the current distribution of the terminal and the antenna radiation pattern can be changed to meet a required specification. The resulting SAR reduction and improvement of field operation performance improve the antenna performance of the terminal.

In accordance with the present invention as described above, the tuner is positioned in the vicinity of the antenna device to change the current distribution of the ground current in the folder and thus change an antenna radiation pattern. Therefore, SAR is reduced and field operation performance is improved, thereby improving the antenna performance of the terminal.

While the invention has been shown and described with reference to certain preferred embodiments thereof, they are mere exemplary applications. For example, the present invention is not limited to a folder-type terminal. It is applicable to any type of portable terminal. Thus, it will be understood by those skilled in the art that various changes in form and details may be made therein without departing from the spirit and scope of the invention as defined by the appended claims.

What is claimed is:

1. A portable terminal comprising:
   a main body having a main body PCB (Printed Circuit Board) and a main body ground defined in the main body PCB;
   a folder;
   a hinge device for rotatably connecting the main body to the folder;
   an antenna device provided at an end of the main body closest to the hinge device; and
   a tuner formed at a predetermined position of the main body in the vicinity of the antenna device, for changing a current distribution of the main body and thus changing an antenna radiation pattern of the portable terminal.

2. The portable terminal of claim 1, wherein the tuner has an "F" or a "P" shape.

3. The portable terminal of claim 1, wherein the tuner includes, at an end thereof, a connector for contacting a grounding portion of the main body ground and an other end of the tuner is remote from the grounding portion and near the antenna device.

4. The portable terminal of claim 1, wherein the tuner is formed of a conductive paint.

5. The portable terminal of claim 1, wherein the tuner is formed of a metal.

6. The portable terminal of claim 1, wherein the tuner is formed in the main body ground.

7. The portable terminal of claim 1, wherein the tuner is formed on a top or a bottom surface of the main body PCB.

8. A portable terminal comprising:
   a main body;
   a folder having a folder PCB (Printed Circuit Board) and a folder ground defined in the folder PCB;
   a hinge device for rotatably connecting the main body to the folder;
   an antenna device provided at an end of the main body closest to the hinge device; and
   a tuner formed at a predetermined position of the folder in the vicinity of the antenna device, for changing a current distribution of the folder and thus changing an antenna radiation pattern of the portable terminal.

9. The portable terminal of claim 8, wherein the tuner has an "F" or a "P" shape.

10. The portable terminal of claim 8, wherein the tuner includes, at an end thereof, a connector for contacting a grounding portion of the folder ground and an other end of the tuner is remote from the grounding portion and near the antenna device.

11. The portable terminal of claim 8, wherein the tuner is formed of a conductive paint.

12. The portable terminal of claim 8, wherein the tuner is formed of a metal.

13. The portable terminal of claim 8, wherein the tuner is formed in the folder ground.

14. A portable terminal comprising:
   a main body having side hinge arms at both sides of an upper end thereof;
   a folder having a center hinge arm rotatably connected between the side hinge arms for hingably connecting the folder to the main body;
   an antenna device protruding from the upper end of the main body; and
   a tuner positioned in the center hinge arm, for changing a radiation pattern of the portable terminal.

15. The portable terminal of claim 14, wherein the folder comprises:
   a front case facing the main body when the folder is closed toward the main body; and
   a rear case attached to the rear of the front case,
   wherein the center hinge arm is installed at an end of the front case and the tuner is covered with the rear case.

16. The portable terminal of 14, wherein the tuner is formed in a pattern which extends along the length of the center hinge arm.

17. The portable terminal of claim 14, wherein the tuner is a conductive tape.

18. The portable terminal of claim 14, wherein the tuner is formed by coating a portion of the center hinge arm with a conductive spray.

* * * * *